(12) United States Patent
Park

(10) Patent No.: US 10,151,859 B2
(45) Date of Patent: Dec. 11, 2018

(54) CAMERA MODULE AND MANUFACTURING METHOD FOR SAME

(71) Applicant: LG INNOTEK CO., LTD., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 4 days.

(21) Appl. No.: 15/024,211

(22) PCT Filed: Sep. 23, 2014

(86) PCT No.: PCT/KR2014/008821
§ 371 (c)(1),
(2) Date: Mar. 23, 2016

(87) PCT Pub. No.: WO2015/041496
PCT Pub. Date: Mar. 26, 2015

(65) Prior Publication Data
US 2016/0241751 A1 Aug. 18, 2016

(30) Foreign Application Priority Data

Sep. 23, 2013 (KR) .................. 10-2013-0112637
Sep. 23, 2013 (KR) .................. 10-2013-0112655

(51) Int. Cl.
*G02B 3/00* (2006.01)
*H04N 5/225* (2006.01)
(Continued)

(52) U.S. Cl.
CPC ......... *G02B 3/0031* (2013.01); *G02B 3/0037* (2013.01); *G02B 5/208* (2013.01);
(Continued)

(58) Field of Classification Search
CPC .. H04N 5/2253; H04N 5/2254; H04N 5/2258; H04N 5/23212; H04N 9/09;
(Continued)

(56) References Cited

U.S. PATENT DOCUMENTS 5,616,912 A 4/1997 Robinson et al.
6,836,612 B2 * 12/2004 Morris ................ G02B 3/0012
359/619

(Continued)

FOREIGN PATENT DOCUMENTS

CN 1934872 A 3/2007
CN 101094320 A 12/2007
(Continued)

OTHER PUBLICATIONS

International Search Report in International Application No. PCT/KR2014/008821, filed Sep. 23, 2014.
(Continued)

*Primary Examiner* — Nhan T Tran
*Assistant Examiner* — Chriss Yoder, III
(74) *Attorney, Agent, or Firm* — Saliwanchik, Lloyd & Eisenschenk

(57) ABSTRACT

An embodiment of the present invention relates to a camera module in which the structure of an image sensor has been improved, and to a method for manufacturing same, the camera module comprising: a printed circuit board on which various elements are mounted; a lens array in which at least on lens is arranged in an direction traversing the optical axis; and a plurality of image sensors mounted on the printed circuit board so as to correspond with the respective lenses.

13 Claims, 7 Drawing Sheets

(51) Int. Cl.
*G02B 5/20* (2006.01)
*H04N 9/09* (2006.01)
*H04N 9/04* (2006.01)

(52) U.S. Cl.
CPC ......... *H04N 5/2253* (2013.01); *H04N 5/2254* (2013.01); *H04N 5/2257* (2013.01); *H04N 5/2258* (2013.01); *H04N 9/045* (2013.01); *H04N 9/09* (2013.01); *G03B 2205/0053* (2013.01)

(58) Field of Classification Search
CPC .. G02B 3/0006; G02B 3/0018; G02B 3/0025; G02B 3/0031; G02B 3/0037; G02B 3/0043; G03B 2205/0053–2205/0084
See application file for complete search history.

(56) References Cited

U.S. PATENT DOCUMENTS

| | | | | |
|---|---|---|---|---|
| 7,388,714 | B2* | 6/2008 | Liang | G02B 21/002 359/625 |
| 8,259,212 | B2* | 9/2012 | Brady | G02B 3/0056 348/335 |
| 8,822,258 | B2* | 9/2014 | Fan | G02B 13/0085 250/208.1 |
| 2004/0012698 | A1* | 1/2004 | Suda | H01L 27/14618 348/315 |
| 2006/0145223 | A1* | 7/2006 | Ryu | H01L 27/14621 257/294 |
| 2007/0102622 | A1* | 5/2007 | Olsen | G02B 7/04 250/208.1 |
| 2007/0230944 | A1 | 10/2007 | Georgiev | |
| 2008/0055753 | A1* | 3/2008 | Takahashi | G02B 7/08 359/824 |
| 2011/0058093 | A1* | 3/2011 | Kim | H04N 5/23212 348/345 |
| 2011/0194019 | A1* | 8/2011 | Shyu | G02B 13/0025 348/360 |
| 2013/0033636 | A1* | 2/2013 | Pitts | H01L 27/14627 348/340 |
| 2013/0083229 | A1* | 4/2013 | Lin | H01L 27/14623 348/336 |
| 2014/0043507 | A1* | 2/2014 | Wang | H04N 5/2254 348/267 |
| 2014/0078388 | A1* | 3/2014 | Kim | H04N 5/2254 348/374 |
| 2016/0112657 | A1* | 4/2016 | Olsen | G02B 3/0062 348/218.1 |

FOREIGN PATENT DOCUMENTS

| | | |
|---|---|---|
| CN | 101427372 A | 5/2009 |
| CN | 102891155 A | 1/2013 |
| JP | H 07-168125 A | 7/1995 |
| JP | 2009-206922 A | 9/2009 |
| KR | 10-2009-0098002 A | 9/2009 |
| KR | 10-2013-0041056 A | 4/2013 |
| WO | WO-2005/072370 A2 | 8/2005 |

OTHER PUBLICATIONS

Office Action dated Feb. 2, 2018 in Chinese Application No. 201480052488.0.

* cited by examiner

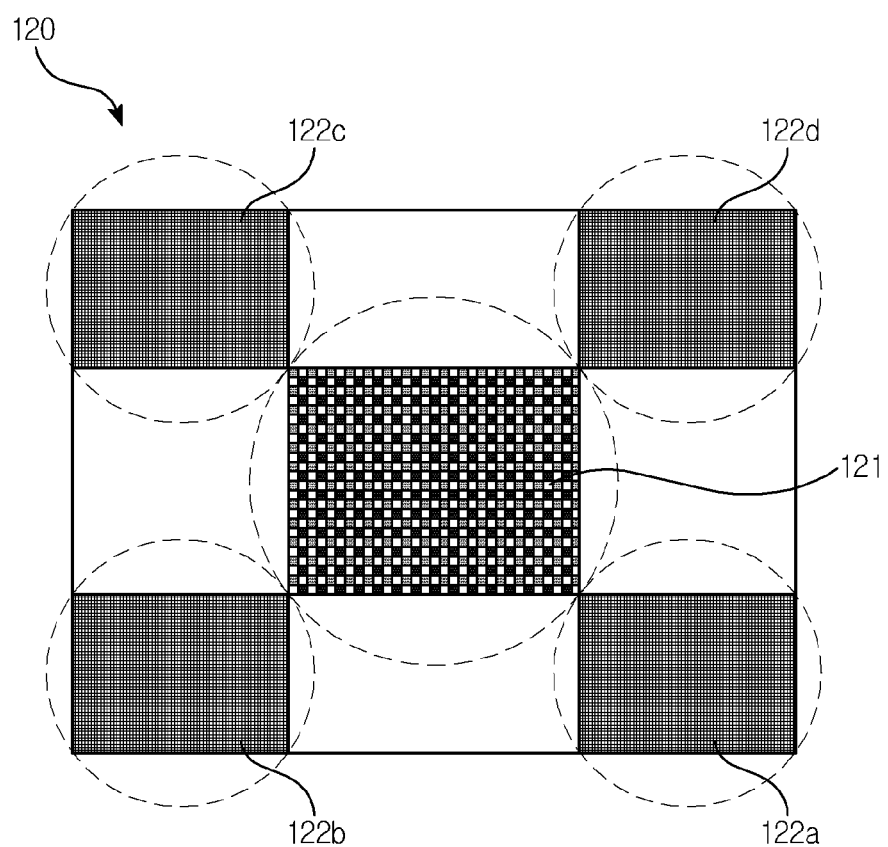

CAMERA MODULE AND MANUFACTURING METHOD FOR SAME

CROSS-REFERENCE TO RELATED APPLICATIONS

This application is the U.S. national stage application of International Patent Application No. PCT/KR2014/008821, filed Sep. 23, 2014, which claims priority to Korean Application Nos. 10-2013-0112655, filed Sep. 23, 2013; and 10-2013-0112637, filed Sep. 23, 2013, the disclosures of each of which are incorporated herein by reference in their entirety.

TECHNICAL FIELD

Exemplary embodiments of the present disclosure relate to a camera module improved in a structure of an image sensor, and to a method for manufacturing the camera module.

BACKGROUND

Concomitant with wide propagation of various mobile terminals and commercialization of wireless Internet services, demands by consumers related to the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data.

In general, the camera module includes a lens unit accommodating at least one lens arranged along an optical axis and an image sensor configured to convert an optical signal of a subject incident from the lens unit into an electrical signal, where the lens unit and the image sensor are mounted in the camera module.

However, only a 2D (two-dimensional) image can be obtained using one lens unit and one image sensor. The 2D image may include damaged information on the light existing in space, and therefore, is limited in its application. That is, the conventional 2D camera module may obtain an integrated value where light components from a single point of an object are gathered at a single point of an image sensor after passing through a lens unit, and therefore, loses information with respect to intensity and direction of individual components of the light.

Henceforth, techniques using a plurality of image sensors are being developed. FIG. 1a illustrates an example of conventional technology, where a lens array (1) is provided. The lens array (1) is formed where a plurality of unit sensors (5) each functioning as an image sensor is arranged on a same plane in plural number, and a plurality of lenses is arranged in a direction traversing an optical axis such that each unit sensor (5) corresponds to each lens.

The camera using plurality of unit sensors (5) causes excessive load on the processor performing image process, and therefore, is useable only for a static image or for a motion picture with low frame rate.

Meanwhile, in order to install the lens array (1) having high light collection rate on the image sensor, a precise six-axis alignment of x, y, z, α, β, and γ is required. In addition, it is practically difficult to manufacture the lens array such that each of the lenses has all the same optical characteristic, or distances from each unit sensor (5) to each lens are all the same. Therefore, the conventional camera module suffers from a problem in that it cannot provide an accurate focal distance for all unit sensors (5).

SUMMARY

Technical Challenge

One purpose of the present disclosure is to provide a camera module with high resolution and a method for manufacturing the camera module.

Another purpose of the present disclosure is to provide a camera module capable of providing a motion picture with low frame rate while using a lens array and a plurality of image sensors, and to provide a method for manufacturing the camera module.

Still another purpose of the present disclosure is to provide a camera module capable of individually adjusting a focal distance of each lens in a lens array, and to provide a method for manufacturing the camera module.

Technical Solution

In a general aspect, there is provided a camera module, comprising: a PCB (Printed Circuit Board) installed with various elements; a lens array including at least one lens arranged in a direction traversing an optical axis; and a plurality of image sensors installed on the PCB each in correspondence to each of the at least one lens.

In some exemplary embodiments, the lens array may include: a main lens provided at a center; and a plurality of sub-lenses, each provided in periphery of the main lens.

In some exemplary embodiments, the camera module may further comprise: a main image sensor mounted on the PCB at a position corresponding to that of the main lens; and a plurality of sub-image sensors, each mounted at a position corresponding to that of each of the plurality of sub-lenses, and each having a number of pixels lower than a number of pixels of the main image sensor.

In another general aspect, there is provided a camera module, comprising: a PCB installed with various elements; a lens array including at least one lens arranged in a direction traversing an optical axis in order to collect an optical signal, by being provided above an image sensor; a plurality of image sensors installed on the PCB, each in correspondence to each of the at least one lens; and a compensation unit provided between the image sensor and the lens array, and configured to compensate a focal distance deviation of each of the lens of the lens array.

In some exemplary embodiments, the compensation unit may be formed of a transparent material having a refractive index different from that of air.

In some exemplary embodiments, the compensation unit is formed as an optical film provided in a different thickness below each of the lens of the lens array.

In some exemplary embodiments, the compensation unit may be formed as a UV (Ultraviolet) resin provided in a different thickness below each of the lens of the lens array.

In some exemplary embodiments, an optical surface of the compensation unit adjacent to each of the lens of the lens array may be formed perpendicular to a traveling direction of light.

In some exemplary embodiments, each of the plurality of image sensors may include: a silicon wafer; a plurality of light-receiving elements provided in the silicon wafer; and a plurality of color filters, each so provided above the silicon wafer as to correspond to the plurality of light-receiving elements.

In some exemplary embodiments, at least one of the plurality of image sensors may be formed as a color filter array including a combination of color filters in red (R), green (G), and blue (B) colors.

In some exemplary embodiments, the camera module may further comprise: an actuator unit configured to fix the lens array and to adjust a focus of an image.

In some exemplary embodiments, the actuator unit may include: a bobbin coupled to an outer circumferential surface of the lens array and fixing a lens unit; a coil unit provided at an outer circumferential surface of the bobbin; a magnet unit provided at a position corresponding to that of the coil unit; and a yoke unit fixing the magnet unit.

In some exemplary embodiments, the camera module may further comprise: a cover can forming an external appearance.

In still another general aspect, there is provided a method for manufacturing a camera module comprising a PCB, a lens array installed at an upper side of the PCB and including at least one lens arranged on a plane traversing an optical axis, and a plurality of image sensors installed on the PCB, the method comprising: forming a plurality of image sensors on a single substrate (first step); forming a lens array including a plurality of lenses arranged in a direction traversing an optical axis in order to concentrate an optical signal to the plurality of image sensors (second step); measuring an individual focal distance of each of the plurality of lenses (third step); generating a compensation unit for compensating a deviation of focal distances of the plurality of lenses (fourth step); installing the compensation unit above the plurality of image sensors (fifth step); and installing the plurality of lenses above the compensation unit (sixth step).

In some exemplary embodiments, the fourth step may include: generating the compensation unit by compensation a focal distance deviation in consideration of a BFL, where the BFL is a distance from the plurality of lenses to the plurality of image sensors.

In some exemplary embodiments, the fourth step may include: generating the compensation unit using a plurality of optical films in different thicknesses.

In some exemplary embodiments, the fourth step may include: generating the compensation unit such that an optical surface of the optical film adjacent to the plurality of lenses lens traverses a traveling direction of light.

In some exemplary embodiments, the fourth step may include: generating the compensation unit using a UV resin provided in a different thickness.

In some exemplary embodiments, the fourth step may include: generating the compensation unit by compressing the UV resin such that an optical surface of the UV resin adjacent to the plurality of lenses lens traverses a traveling direction of light.

Advantageous Effect

According to an exemplary embodiment of the present disclosure, a focus of light reaching each of the light-receiving elements can be equalized such that a high resolution can be implemented, even when the light-concentrating performance of each lens of the lens array is not equal.

According to an exemplary embodiment of the present disclosure, a focus of light reaching each of the light-receiving elements can be equalized such that a high resolution can be implemented, even when a deflection occurs during the manufacturing process of an image sensor.

BRIEF DESCRIPTION OF DRAWINGS

FIG. 1b is a view illustrating image sensors illustrated in FIG. 1a.

FIG. 2 is a view illustrating a plurality of image sensors according to another exemplary embodiment of the present disclosure.

DETAILED DESCRIPTION

Hereinafter, exemplary embodiments of the present disclosure will be described in detail with reference to the accompanying drawings.

Unless defined otherwise herein, all technical and scientific terms used herein have the same meaning as commonly understood by one of ordinary skill in the art to which this invention belongs. In a case when a term used herein conflicts with the customary meaning of the corresponding term, the meaning of the term defined herein shall supersede the customary meaning.

However, the terms mentioned herein are used merely for description of a particular exemplary embodiment. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

Hereinafter, a camera module according to some exemplary embodiments of the present disclosure will be described in detail with reference to the accompanying drawings.

Figure 1A:
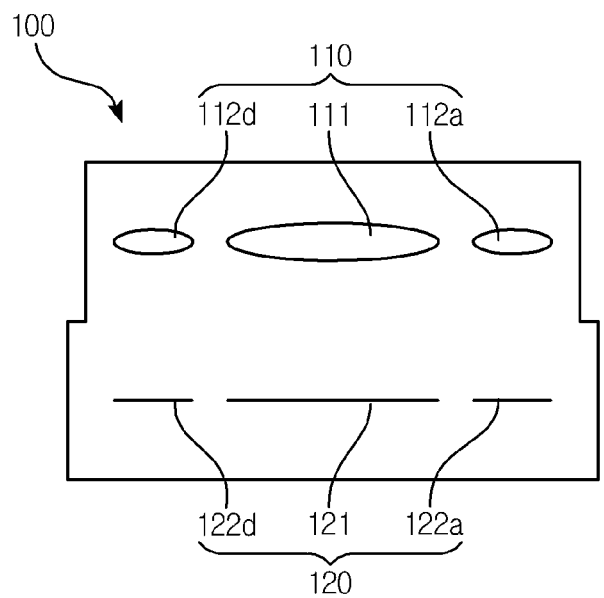
FIG. 1a is a schematic view illustrating a camera module according to an exemplary embodiment of the present disclosure.
Figure 1B:
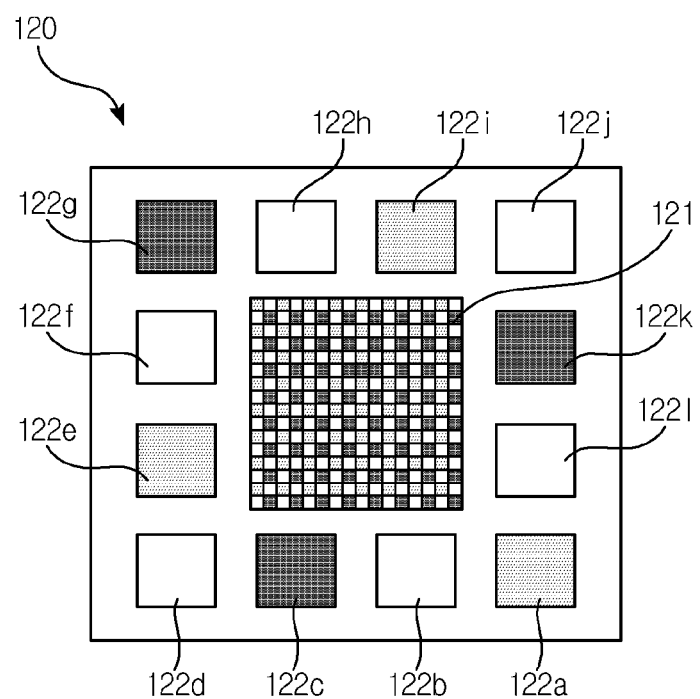

FIG. 1a is a schematic view illustrating a camera module (100) according to an exemplary embodiment of the present disclosure, and FIG. 1b is a view illustrating image sensors illustrated in FIG. 1a.

Referring to FIG. 1a, the camera module (100) according to an exemplary embodiment of the present disclosure may include a lens array (110), and a plurality of image sensors (120).

The lens array (110) may include a plurality of lenses (111, 112a, 112d) arranged in a direction traversing an optical axis, preferably in a direction perpendicular to the optical axis.

The plurality of image sensors (120) may include a plurality of image sensors (121, 122a-122l) installed on the PCB, where the plurality of image sensors (121, 122a-122l) is arranged in correspondence to each of the lenses (111, 112a-112d).

In addition, an F.F (Fixed Focusing) type having no actuator unit may be applied to the camera module (100) according to an exemplary embodiment of the present disclosure. Although it is not illustrated, the camera module (100) may include an actuator of an A.F (Auto Focusing) or an OIS (Optical Image Stabilization) type where the lens array (110) is fixed and the lens array (110) is moved to focus an image.

In addition, an infrared cut-off filter (IR filter, not illustrated) may be provided between the plurality of image sensors (120) and the lens array (110). The IR filter may be formed of, for example, a film material or a glass material. Also, the IR filter may be formed by a process where a kind of infrared cut-off coating material is arranged on a flat optical filter such as a cover glass for image plane protection.

In order to dispose the IR filter, a base (not illustrated) may be provided between the actuator unit and the PCB. The IR filter may be installed at a center hole formed in the center of the base. Here, the base may be a component forming a structure of the actuator unit and may be integrally formed with the actuator unit. Alternatively, the base may serve a sensor holder protecting the image senor, when the base is of the F.F type.

In addition, the camera module (100) may include a cover can accommodating the lens array (110) and the actuator unit and forming an external appearance of the camera module (100). The cover can may protect the camera module (100) from external impacts, and may be formed of a metallic material in order to prevent damages due to static electricity.

Here, the lens array (110) may be formed by accommodating at least one lens. In addition, each of the lenses composing the lens array (110) may be a single lens, or may be a lens barrel including a plurality of lenses arranged in an optical axis direction, but not limited hereto. Thus, any holder structure which is able to support a lens may be employed.

In particular, the lens array (110) may include a main lens (111) provided at a center and a plurality of sub-lenses (112a, 112d), where each of the plurality of sub-lenses (112a, 112d) is provided in periphery of the main lens. Here, each of the main lens (111) and the sub-lenses (112a, 112d) may be a single lens, or may be a lens barrel as a lens group where a plurality of lenses is arranged in the optical axis direction. A diameter of the main lens (111) may be the same as the diameter of the sub-lenses (112a, 112d). Alternatively, the diameter of the main lens (111) may be larger than the diameter of the sub-lenses (112a, 112d).

Referring to FIG. 1b, the plurality of image sensors (120) may include a plurality of image sensors (121, 122a-122l) installed on the PCB in correspondence to each of the lenses (111, 112a-112d). That is, the plurality of image sensors (120) may include a main image sensor (121) installed on the PCB at a position corresponding to the position of the main lens (111), and a plurality of sub-image sensors (122a-112l) installed on the PCB at a position respectively corresponding to the position of the plurality of sub-lenses (112a-112d).

The plurality of image sensors (120) may convert an optical signal of a subject incident from the lens into an electrical signal. Each one of the plurality of image sensors (120) may include a silicon wafer, a plurality of light-receiving elements provided in the silicon wafer, and a plurality of color filters, where each of the plurality of color filters is so provided above the silicon wafer as to correspond to the plurality of light-receiving elements.

In addition, a cover glass made of a glass material may be additionally installed at an upper side of the color filter. The cover glass may be provided in order to prevent deflection of the image sensor and introduction of foreign materials.

Meanwhile, a lens array for concentrating the optical signal to the light-receiving element may be provided at an upper side of the image sensor. The lens array may take a shape of an array formed of a plurality of lenses arranged in a direction traversing the optical axis.

The color filter may be formed as a color filter array including a combination of color filters in filters in red (R), green (G), and blue (B) colors. In particular, the main image sensor (121) may be implemented as a pixel array including a combination of RGB pixels, and may have numbers of pixels corresponding to the performance of preview images or motion pictures required for the camera module (100).

Meanwhile, the sub-image sensors (112a-122l) may be provided in periphery of the main image sensor (121), and may have a number of pixels lower than a number of the main image sensor (121). All of the sub-image sensors (122a-122l) may be formed as a unitary color (for example, red color filter). Alternatively, the sub-image sensors (122a-122l) may be formed as an array of RGB pixels, like the foregoing main image sensor (121).

Alternatively, the sub-image sensors (122a-122l) may be formed as color filters in different colors, as illustrated in the figures. Referring to FIG. 1b, the sub-image sensors (122a, 122e, 122i) have blue color filters, the sub-image sensors (122b, 122d, 122f, 122h, 122j, 122l) have green color filters, and the sub-image sensors (122c, 122g, 122k) have blue color filters. However, the present disclosure is not limited hereto. Thus, arrangement and number of each of the colors are adjustable.

As described in the foregoing, the camera module (100) according to an exemplary embodiment of the present disclosure may include a lens array (110) and a plurality of image sensors (120) provided at a position corresponding to a position of the lens array (110). Thereby, the camera module (100) may obtain information with respect to light component in different directions from a point of an object, and may store the information as images. Then, the camera module (100) may calculate a parallax of each image, and may generate new images such as super resolution, re-viewpoint, re-focusing, and distance measurement.

In addition, unlike a single camera type, the camera module (100) according to an exemplary embodiment of the present disclosure may implement various functions, preview images, and motion pictures of high frame speed as well, by including the lens array (110) and the plurality of image sensors (120) according to an exemplary embodiment of the present disclosure.

Meanwhile, as illustrated in FIGS. 1a and 1b, the main lens (111) and the main image sensor (121) may be provided at a center, and the sub-lenses (112a, 112d) and the sub-image sensors (122a-122l) are provided in twelve units. However, the present disclosure is not limited to such arrangement.

Figure 3:
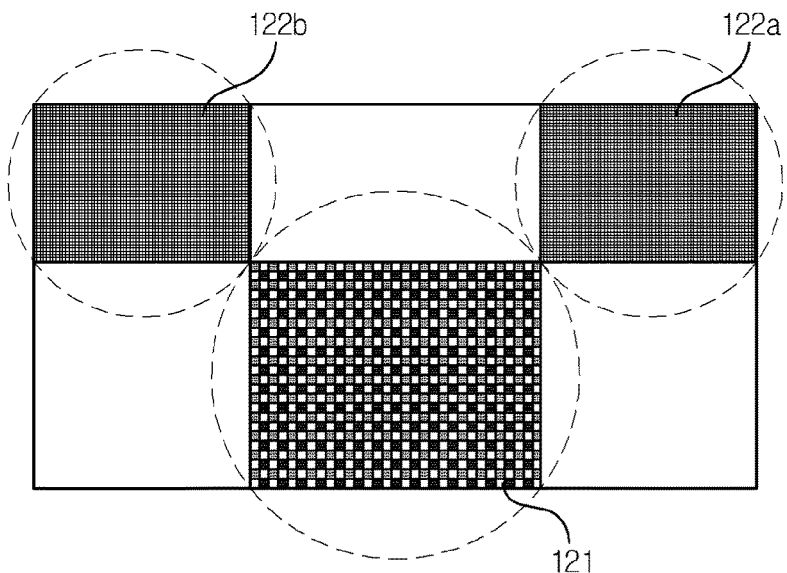
FIG. 3 is a view illustrating a plurality of image sensors according to still another exemplary embodiment of the present disclosure.

FIG. 2 is a view illustrating a plurality of image sensors (120) according to another exemplary embodiment of the present disclosure, and FIG. 3 is a view illustrating a plurality of image sensors (120) according to still another exemplary embodiment of the present disclosure.

Referring to FIG. 2, the plurality of image sensors (120) according to another exemplary embodiment of the present disclosure may be an example of a structure using a 4:3 sensor. According to the exemplary embodiment, one main image sensor (121) may be provided in a center, and four sub-image sensors (122a-122d) may be provided at each edge. It will be apparent that the number and diameter of the main lens (111) and sub-lenses (112a, 112d) may be determined in correspondence to the plurality of image sensors (120). Features of the main lens (111) and the plurality of image sensors (120) may be the same as previously described in the above.

Referring to FIG. 3, the plurality of image sensors (120) according to still another exemplary embodiment of the present disclosure may be an example of a structure using a 16:9 sensor. According to the exemplary embodiment, one main image sensor (121) may be provided in a center, and two sub-image sensors (122a, 122b) may be provided at two edges. It will be apparent that the number and diameter of the main lens (111) and sub-lenses (112a, 112d) may be determined in correspondence to the plurality of image sensors (120). Features of the main lens (111) and the plurality of image sensors (120) may be the same as previously described in the above.

To sum up, the present disclosure has advantages in that the camera module according to an exemplary embodiment of the present disclosure can implement various functions, preview images, and motion pictures of high frame speed as well, by including the lens array and the plurality of image sensors.

Figure 4:
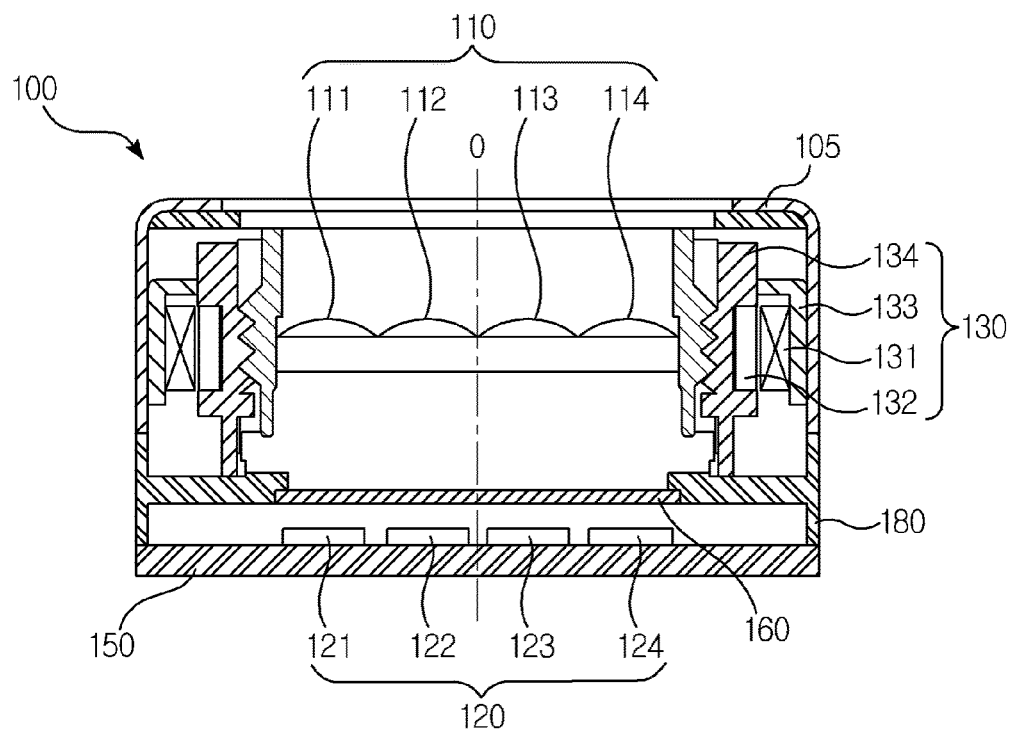
FIG. 4 is a lateral sectional view of a camera module according to an exemplary embodiment of the present disclosure.

FIG. 4 is a lateral sectional view of a camera module according to still another exemplary embodiment of the present disclosure.

Referring to FIG. 4, the camera module (100) according to still another exemplary embodiment of the present disclosure may generally include a lens unit (140), an actuator unit (130), an image sensor (120), and a PCB (150).

In addition, the camera module (100) may further include a cover can (105) forming an external appearance of the camera module (100) and accommodating the lens unit (140) and the actuator unit (130). It will be apparent that the shape of external appearance of the cover can (105) may vary according to accommodating environment in the camera.

The PCB (150) may be provided at a lower side of the actuator unit (130). Various elements for operating the camera module (100) may be installed on the PCB (150). The PCB (150) may apply electric power for operating the actuator unit (130) to the actuator unit (130).

The image sensor (120) may be installed in plural number on the PCB (150) such that the plurality of image sensors (120) can be disposed with at least one lens accommodated in the lens unit (140) along the optical axis direction (O). Each of the image sensors (121, 122, 123, 124) may convert an optical signal of the subject incident through the lens into an electrical signal. The plurality of image sensors (121, 122, 123, 124) according to the exemplary embodiment correspond to the plurality of image sensors (121, 122a, 122d) according to the previous exemplary embodiment illustrate in FIG. 1a. However, unlike the previous exemplary embodiment, each of the plurality of image sensors (121, 122, 123, 124) according to the present exemplary embodiment may be in the same size, thus are not required to be categorized into the main sensor and the sub-sensor.

The lens unit (140) may include a lens array (110) including a plurality of lenses (111, 112, 113, 114) arranged on a plane traversing the optical axis (O). Here, each of the lenses (111, 112, 113, 114) composing the lens array (110) may be a single lens, or may be a lens barrel including a plurality of lenses arranged in the optical axis (O) direction, but not limited hereto. Thus, any holder structure which is able to support a lens may be employed. The plurality of lenses (111, 112, 113, 114) according to the exemplary embodiment correspond to the plurality of image sensors (111, 112a, 112d) according to the previous exemplary embodiment illustrate in FIG. 1a. However, unlike the previous exemplary embodiment, each of the plurality of image lenses (111, 112, 113, 114) according to the present exemplary embodiment may be in the same size, thus are not be required to be categorized into the main lens and the sub-lens.

The lens unit (140) may be accommodated in the cover can (105). Each of the lenses (111, 112, 113, 114) of the lens array (110) may be arranged at a position corresponding to a position of each of the plurality of image sensors (120).

The lens unit (140) may be installed and fixed inside the actuator unit (130). The actuator unit (130) may move the lens unit (140) to adjust the image focus. In particular, the actuator unit (130) may include a bobbin (134) fixing the lens unit (140) by being combined with an outer circumferential surface of the lens unit (140), a coil unit (132) provided at an outer circumferential surface of the bobbin (134), a magnet unit (131) provided a position corresponding to a position of the coil unit (132), and a yoke unit (133) fixing the magnet unit (131).

In addition, as previously described, a separate covers can (105) accommodating the actuator unit (130) may be additionally provided. In this case, the lens unit (140) and the actuator unit (130) may all disposed inside of the cover can (105).

In this state, a current may be applied to the coil unit (132) by a driving signal applied by the PCB (150). Thereby, the bobbin (134) fixing the lens unit (140) may be moved upward and downward along the optical axis (O) direction, by the magnet unit (131) interacting with the coil unit (132).

The actuator unit (120) may be an AF (Auto Focusing) actuator in which a voice coil motor is applied. However, the present disclosure is not limited hereto. Thus, an OIS (Optical Image Stabilization) typed or F.F (Fixed Focusing) typed camera module (100) may also be employed, rather than the exemplary embodiments illustrated in the figures. The camera module (100) of the F.F type may include a lens holder unit accommodating the lens unit (140), instead of the actuator unit (130).

Meanwhile, an IR (Infrared) filter (160) may be provided between the image sensor (120) and the lens unit (140). The IR filter (160) may be an infrared ray filter. The IR filter (160) may be formed of, for example, a film material or a glass material. Also, the IR filter (160) may be formed by a process where a kind of infrared cut-off coating material is arranged on a flat optical filter such as a cover glass for image plane protection.

In order to dispose the IR filter (160), a base (180) may be provided between the actuator unit (130) and the PCB (150). In this case, the IR filter (160) may be installed at a center hole portion formed in the center of the base (180). Here, the base (180) may be formed as a component forming the structure of the actuator unit (130) and integrally formed with the actuator unit (130). Alternatively, the base (180) may function as a sensor holder protecting the image sensor (120) separately from the actuator unit (130).

In addition, the IR filter (160) may be arranged at the sensor holder or at the actuator unit (130), and may be disposed at an upper surface of each the plurality of image sensors (120).

Meanwhile, as described in the foregoing, exemplary embodiments of the present disclosure may also be employed in the camera module of the F.F (Fixed Focusing) type. In this case, the actuator unit (130) for moving the lens unit (140) is not required. Therefore, a cylindrical fixing unit (not illustrated) for fixing the lens unit (140) may be formed at an upper side of the base (180). That is, a cylindrical fixing unit such as the illustrated bobbin (134) may be formed at an upper side of the base (180).

Herein, an exemplary embodiment of the present disclosure suggests a technical idea for compensating a focal distance of each of the lenses (111, 112, 113, 114) of the lens array (110) provided at an upper side of the image sensor (120). Such focal distance compensation may include a focal distance compensation with respect to BFL (Back Focal Length) of each of the lenses (111, 112, 113, 114) composing the lens array (110), and a compensation of BFD (Back Focal Distance) as well. Here, the BFD (Back Focal Distance) refers to a distance from each of the plurality of lenses (111, 112, 113, 114) to each of the plurality of image sensors (121, 122, 123, 124).

The technical idea may be implemented by a compensation unit (170) to be particularly described in the following.

Figure 5:
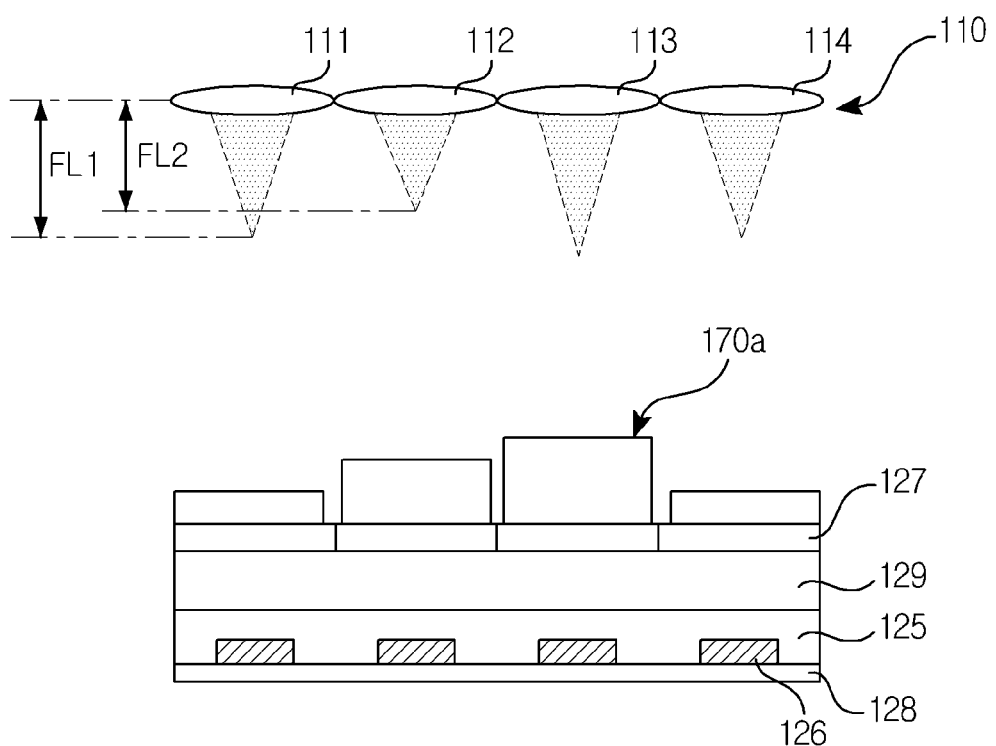
FIG. 5 is a schematic view illustrating an image sensor having a compensation unit according to an exemplary embodiment of the present disclosure.
Figure 6:
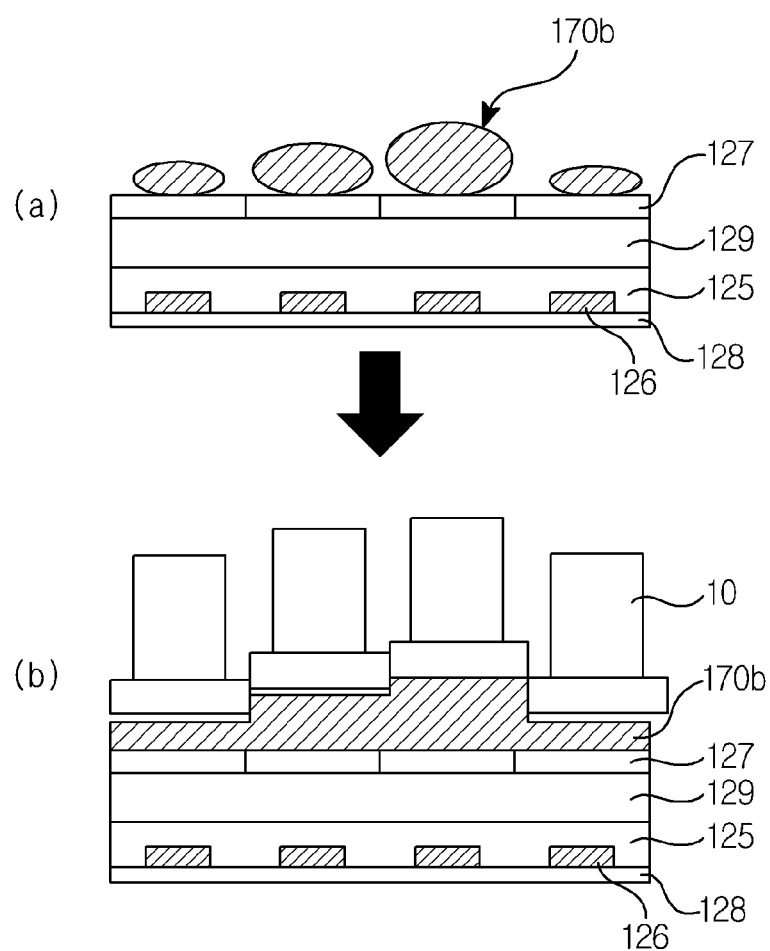
FIG. 6 is a schematic view illustrating an image sensor having a compensation unit according to another exemplary embodiment of the present disclosure.

FIG. 5 is a schematic view illustrating an image sensor (120) having a compensation unit (170a) according to still another exemplary embodiment of the present disclosure, and FIG. 6 is a schematic view illustrating an image sensor (120) having a compensation unit (170b) according to still another exemplary embodiment of the present disclosure.

Referring to FIGS. 5 and 6, the image sensor (120) may include a silicon wafer (125), a plurality of light-receiving elements (126) provided in the silicon wafer (125), a plurality of color filters (127) so provided at an upper side of the silicon wafer (125) as to correspond to the plurality of light-receiving elements (126), and an FPCB (Flexible Printed Circuit Board, 128) provided at a lower side of the silicon wafer (125) and configured to apply electric power to the image sensor (120).

Here, the FPCB (128) may correspond to the PCB (150) mentioned in the foregoing. In addition, each of the light-receiving elements (126) may individually obtain an image. The light-receiving elements (126) may correspond to the plurality of image sensors (121, 122, 123, 124) mentioned in the foregoing. That is, although each light-receiving element is individually arranged on a single wafer in the present exemplary embodiment, an image sensor package formed as an individual package (independent image sensor) may also be arranged. Alternatively, an effective area of a single image sensor may be divided into a plurality of areas, and each of the divided areas may be deemed as a single light-receiving element.

In addition, a cover glass (129) made of a glass material may be additionally installed on an upper or lower side of the color filter (127). The cover glass may be provided in order to prevent deflection of the image sensor and introduction of foreign materials.

Meanwhile, a lens array (110) for concentrating an optical signal to the light-receiving element (126) may be provided at an upper side of the image sensor (120). The lens array (110) may take a shape of an array formed of a plurality of lenses (111, 112, 113, 114), in order to concentrate the optical signal to each of the light-receiving elements (126).

Each of the of lenses (111, 112, 113, 114) of the lens array (110) may be formed to have predetermined thickness and curvature radius, such that the light can be properly refracted depending on a size of the light-receiving element (126). Each of the lenses (111, 112, 113, 114) included in the lens array (110) may not be completely the same in its shape and refractive index. Therefore, as illustrated in FIG. 5, each of the lenses (111, 112, 113, 114) may have a focal distance different from each other. For example, a focal distance (FL1) of the first-to-left lens (111) in FIG. 5 may be longer than a focal distance (FL2) of the second-to-left lens (112). Consequently, the resolution of the camera module (100) may be degraded.

Therefore, according to an exemplary embodiment of the present disclosure, a compensation unit (170) configured to compensate a focal distance deviation of each of the lenses (111, 112, 113, 114) of the lens array (110) may be provided. The compensation unit (170) may be provided between the image sensor (120) and the lens array (110).

In particular, the compensation unit (170) may be provided in order to compensate a focal distance of an optical signal passing through the lens array (110), and may be formed of a transparent material having a refractive index different from that of air. In addition, the compensation unit (170) may take such a shape that a height in an optical direction of the compensation unit (170) may become higher as a focal distance of each lens becomes shorter, and that a height in an optical direction of the compensation unit (170) may become lower as a focal distance of each lens becomes longer.

As an example, referring to FIG. 5, a compensation unit (170a) in rectangular shape is illustrated as an example of the compensation unit (170). The compensation unit (170a) may be formed as an optical film provided in a different thickness below each of the lenses (111, 112, 113, 114). That is, the compensation unit (170a) may be formed as a plurality of optical films respectively provided between the plurality of lenses (111, 112, 113, 114) and the plurality of light-receiving elements (126). Alternatively, rather than as illustrated in the figures, the compensation unit (170a) may be formed as a single optical film of which upper surface forms a stepped shape.

As another example, referring to FIG. 6, a plastically deformable compensation unit (170b) is illustrated as another example of the compensation unit (170). The compensation unit (170b) may be formed as UV (Ultraviolet) resin provided in a different thickness below each of the lenses (111, 112, 113, 114). That is, the compensation unit (170b) may be formed by a process where a plurality of UV resins is respectively coated between the plurality of lenses (111, 112, 113, 114) and the plurality of light-receiving elements (126), and the coated resin is compressed by a press (10). Alternatively, rather than as illustrated in the figures, the compensation unit (170b) may be formed as a single UV resin of which upper surface forms a stepped shape.

Meanwhile, a method for manufacturing an image sensor (120) of a camera module (100) according to an exemplary embodiment of the present disclosure is as described in the following.

Figure 7:
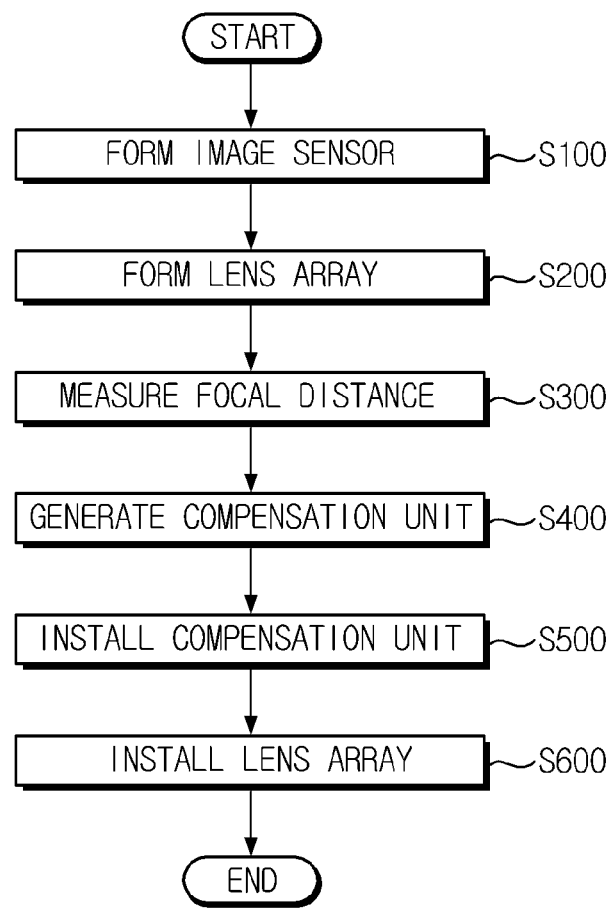
FIG. 7 is a flow chart illustrating a method for manufacturing a camera module according to an exemplary embodiment of the present disclosure.

FIG. 7 is a flow chart illustrating a method for manufacturing a camera module (100) according to an exemplary embodiment of the present disclosure.

As first, an image sensor (120) including a plurality of light-receiving elements (126) may be formed (S100). The forming of the image sensor (120) may be implemented by a process as described in the foregoing, wherein a plurality of light-receiving elements (126) is arranged in a silicon wafer (125), and a color filter (127) is additionally installed at an upper side of the silicon wafer (125) such that each of the a color filters (127) corresponds to each of the plurality of light-receiving elements (126). In addition, an FPCB (128) for applying electric power to the image sensor (120) may be installed at a lower side of the silicon wafer (125), and a cover glass (129) may be additionally installed at an upper side of the color filter (127).

Then, a lens array (110) including a plurality of lenses (111, 112, 113, 114) arranged on a plane traversing the optical axis (O) may be formed in order to concentrate an optical signal to the image sensor (120) (S200). The lens array (110) may be manufactured by a process where a sensitizer for lenses is coated and patterned, and the patterned sensitizer for lenses is flowed by heat to form a plurality of lenses (111, 112, 113, 114) taking a shape of a dome. Alternatively, the lens array (110) may be formed by a process where a plurality of individually manufactured lenses is arranged on a plane and combined with one another.

Then, an individual focal distance of each of the plurality of lenses 111, 112, 113, 114) formed in the step S200 may be measured (S300). A through focus method, which is a method also used in measuring a focus of a lens, may be employed in the measuring of focal distance.

Then, a compensation unit (170) for compensating a deviation of focal distances of the plurality of lenses (111, 112, 113, 114) may be generated (S400). As described in the foregoing, the focal distance compensation may include a focal distance compensation with respect to a BFL (Back Focal Length) that is a focal distance of each of the lenses (111, 112, 113, 114) composing the lens array (110), and a compensation of BFD (Back Focal Distance) that is a distance from the lenses (111, 112, 113, 114) to the light-receiving elements (126) as well. Therefore, in the current step, the compensation unit (170) may be generated in consideration of the distance from the lenses (111, 112, 113, 114) to the light-receiving elements (126) provided in the image sensor (120). This is because the distance from each of the lenses (111, 112, 113, 114) to each of the light-receiving elements (126) may be different, when the image sensor (120) is deflected.

The compensation unit (170) may be formed as an optical film provided in a different thickness below each of the lenses (111, 112, 113, 114). In this case, the compensation unit (170) may be formed such that an optical plane adjacent to the lenses (111, 112, 113, 114) in the optical film is formed vertical to a traveling direction of light. Here, a direction vertical to the traveling direction of light may refer to a direction vertical to a straight line with respect to a center of the lenses (111, 112, 113, 114) and a center of the light-receiving elements (126). Alternatively, the direction vertical to the traveling direction of light may refer to the optical axis direction.

The compensation unit (170) may be formed as UV (Ultraviolet) resin provided in a different thickness below each of the lenses (111, 112, 113, 114). In this case, the compensation unit (170) may be formed by compressing the UV resin using a press (10), such that an optical plane adjacent to the lenses (111, 112, 113, 114) in the UV resin is formed vertical to a traveling direction of light. Here, a direction vertical to the traveling direction of light may refer to a direction vertical to a straight line with respect to a center of the lenses (111, 112, 113, 114) and a center of the light-receiving elements (126). Alternatively, the direction vertical to the traveling direction of light may refer to the optical axis direction.

Then, the generated compensation unit (170) may be installed at an upper side of the image sensor (120) (S500). The lens array (110) including the plurality of lenses (111, 112, 113, 114) may be installed at an upper side of the compensation unit (170) (S600).

Hereinafter, a method for manufacturing the image sensor (120) according to an exemplary embodiment of the present disclosure will be described schematically.

Figure 8:
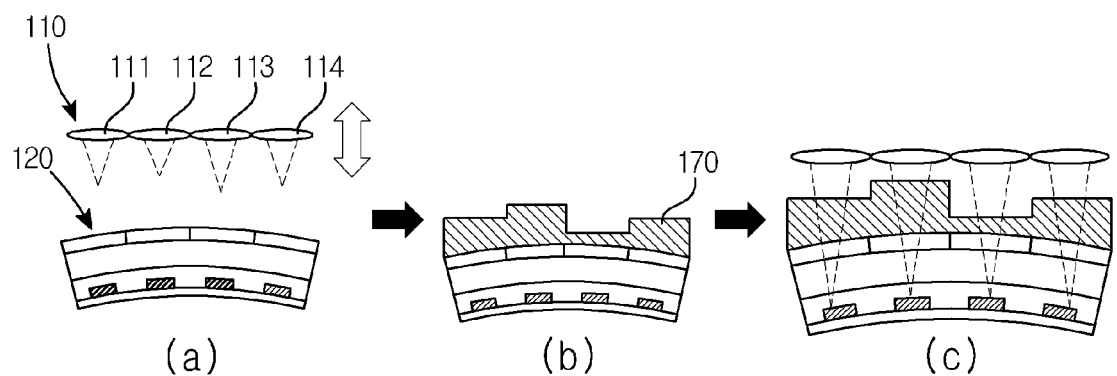
FIG. 8 is a schematic view illustrating a process to manufacture an image sensor according to an exemplary embodiment of the present disclosure.

FIG. 8 is a schematic view illustrating a process to manufacture an image sensor according to an exemplary embodiment of the present disclosure.

Schematically, FIG. 8 illustrates an example of a structure for compensating a lens array having BFL deviation. That is, an optical medium for compensating BFL may be arranged on or above a cover glass of the sensor, such that the overall focus of the lens can be formed on a surface of the sensor. The compensation can compensate the BFL of the lens, and deflection phenomenon generated in the sensor as well.

To sum up, FIG. 8 illustrates a comparison between the conventional active align process and the active align process including the BFL compensation structure. Here, the BFL deviation obtained after measuring the through focus may be calculated such that a thickness of medium for compensating the BFL deviation can be determined, and the medium having the determined thickness may be generated on the sensor surface. The process will be described by steps in the following.

State (a) of FIG. 8 is a state where a focal distance is calculated and determined, after the image sensor (120) and the lens array (110) including a plurality of lenses (111, 112, 113, 114) are generated.

Then, in state (b) of FIG. 8, the compensation unit (170) generated in consideration of the distance from the lenses (111, 112, 113, 114) to the corresponding light-receiving elements (126) may be additionally installed at an upper side of the image sensor (120).

State (c) of FIG. 8 illustrates a state where the lens array (110) generated in the state (a) is finally installed.

Exemplary embodiments of the present disclose provide advantages in that each BFL of the lenses (111, 112, 113, 114) that are not completely the same can be compensated, and the light-concentrating capacity of the light-receiving elements (126) can be completely compensated in consideration of the distance to the image sensor (120) that may be deflected due to such as heat process. Thereby, a camera module (100) having high resolution can be implemented.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims and equivalents thereof.

The invention claimed is:

1. A method for manufacturing a camera module comprising a PCB, a lens array installed at an upper side of the PCB and including a plurality of lenses arranged on a plane traversing an optical axis, a plurality of image sensors installed on the PCB, the method comprising:

forming the plurality of image sensors on a single substrate;

forming the lens array including the plurality of lenses arranged in a direction traversing the optical axis in order to concentrate an optical signal to the plurality of image sensors;

measuring an individual focal distance of each of the plurality of lenses;

generating a compensation unit between each of the image sensors and each of the lenses, for compensating a deviation of focal distances of the plurality of lenses;

installing the compensation unit above the plurality of image sensors; and installing the plurality of lenses above the compensation unit, wherein the compensation unit is monolithically formed of an Ultraviolet (UV) resin having a different thickness below each lens of the lens array, respectively, wherein the step of generating a compensation unit includes compensating a focal distance deviation based on a Back Focal Length (BFL), which is a focal distance of each lens of the lenses, and compensating a Back Focal Distance (BFD), which is a distance from one lens of the lenses to a corresponding sensor of the image sensors, wherein the compensation unit is formed by compressing the Ultraviolet (UV) resin with a press and includes a plurality of object side surfaces facing an object and an image side surface facing the plurality of image sensors, wherein each of the object side surfaces of the compensation unit is integrally formed with other object side surfaces to form a step-shaped surface with different thicknesses between each respective object side surface and the image side and the image side surface of the compensation unit contacts upper surfaces of the plurality of image sensors, and wherein the plurality of image sensors comprises a silicon wafer, a plurality of light-receiving elements disposed in the silicon wafer, a cover glass disposed on the silicon wafer, and a plurality of color filters disposed on the cover glass.

2. The method of claim 1, wherein the step of generating the compensation unit includes compensating a focal distance deviation based on the BFL.

3. The method of claim 2, wherein each BFL of the lenses is different from other BFLs of the lenses.

4. The method of claim 2, wherein the compensation unit for compensating the BFL is arranged on or above the cover glass of the image sensors.

5. The method of claim 1, wherein
the plurality object side surfaces of the compensation unit is flat.

6. The method of claim 1, wherein the compensation unit is formed of a transparent material having a refractive index different from that of air.

7. The method of claim 6, wherein the compensation unit is formed as an optical film provided with different thicknesses with respect to each lens of the lenses.

8. The method of claim 7, wherein the compensation unit is formed such that an optical plane adjacent to each lens of the lenses in the UV resin is formed vertically in a traveling direction of light.

9. The method of claim 1, wherein the compensation unit compensates a distance deviation from each lens of the lens array to each respective image sensor.

10. The method of claim 1, wherein the compensation unit is installed at an upper side of the image sensors.

11. The method of claim 1, wherein the lens array is manufactured by a process where a sensitizer for lenses is coated and patterned, and the patterned sensitizer for lenses is flowed by heat to form a plurality of lenses.

12. The method of claim 11, wherein each of the plurality of lenses takes a shape of a dome.

13. The method of claim 1, wherein the lens array is manufactured by a process where a plurality of individually manufactured lenses is arranged on a plane and combined with one another.

* * * * *